United States Patent [19]

Toyoguchi et al.

[11] 4,172,927
[45] Oct. 30, 1979

[54] ORGANIC ELECTROLYTE BATTERY

[75] Inventors: Yoshinori Toyoguchi, Osaka; Nobuo Eda, Katano; Takashi Iijima, Hirakata, all of Japan

[73] Assignee: Matsushita Electric Industrial Co., Ltd., Osaka, Japan

[21] Appl. No.: 949,380

[22] Filed: Oct. 6, 1978

Related U.S. Application Data

[63] Continuation of Ser. No. 825,857, Aug. 18, 1977, abandoned.

[51] Int. Cl.$^2$ ............................................. H01M 6/14
[52] U.S. Cl. .................................... 429/194; 429/220
[58] Field of Search ............... 429/194, 195, 197, 218, 429/220

[56] References Cited

U.S. PATENT DOCUMENTS

| | | | |
|---|---|---|---|
| 3,796,604 | 3/1974 | Gabano et al. | 429/197 |
| 3,951,685 | 4/1976 | Kronenberg | 429/197 |
| 3,960,595 | 6/1976 | Lehmann | 429/220 X |
| 3,982,958 | 9/1976 | Newman | 429/194 X |

Primary Examiner—Charles F. LeFevour
Attorney, Agent, or Firm—Wenderoth, Lind & Ponack

[57] ABSTRACT

This invention relates to improvement in an organic electrolyte battery employing a light metal as an anodic material; organic electrolyte; and CuO as a cathodic material.

By using, as the cathodic material, the solid solution of alkali metal oxide and CuO as a mother substance, the delivered volumetric energy density of the battery is fairly increased.

11 Claims, 3 Drawing Figures

ORGANIC ELECTROLYTE BATTERY

CROSS-REFERENCE TO RELATED APPLICATIONS is a continuation of application Ser. No. 825,857, filed Aug. 18, 1977, now abandoned.

BACKGROUND OF THE INVENTION

The present invention relates to an organic electrolyte battery in which a light metal such as lithium, magnesium, aluminum, etc., is used as an anode, and an organic electrolyte having an inorganic supporting salt dissolved in an organic solvent which does not react with light metals used as an anode is employed.

As the cathodic active material of the battery of this type, such a metal halide as nickel floride, such an oxide of metal as manganese dioxide or carbon fluoride, etc., may be used. Such batteries are characterized by their energy densities being as high as 500–600 Wh/l and their operating voltages being 2.3–2.8 V, which are higher than those for the conventional batteries available on the market.

On the other hand, some batteries with lithium anode and copper oxide cathode, are known to give a working voltage of 1.2 V and energy densities of 400–600 Wh/l. Thus, the Li/CuO battery system are expected to give a working voltage similar to those of the batteries commonly available on the market and high volumetric energy densities.

DESCRIPTION OF THE PRIOR ART

In a conventional organic electrolyte batteries in which CuO is used as a cathode, CuO has been obtained by thermaldecomposition of copper nitrate or copper carbonate in air at 900° C., the electronic conducitivity of the CuO obtained in this way is as low as about $3 \times 10^{-3}$ ω/cm. Because of this high resistance, it was impossible to use CuO without a conductive agents as the cathode.

To use it as the cathode, carbon powder was added as a conductive material and a binding agent was added before it was press-formed. The coulombic capacity per unit volume of the cathode produced in this way is reduced. If the highly conductive CuO was used, however, it was considered possible to eliminate the amount of the carbon powder to be mixed with CuO for providing the desired conductivity and that of the binding agent, and also, in manufacturing batteries used for low rate discharge, to compose the cathode with CuO only without employing the conductive material and the binding agent, and thereby increasing the coulombic capacity per unit volume.

SUMMARY OF THE INVENTION

The present invention was made in the above-described background, and therefore the object of the present invention is to provide an improved organic electrolyte battery having a high energy density by improving the aforementioned batteries in which cupric oxide (CuO) is used as a cathode.

The above-described object is achieved by using as the cathodic active material the solid solution of alkali metal oxide and the CuO as a mother substance.

Other and further objects, features and advantages of the invention will appear more fully from the following description.

Figure 1:
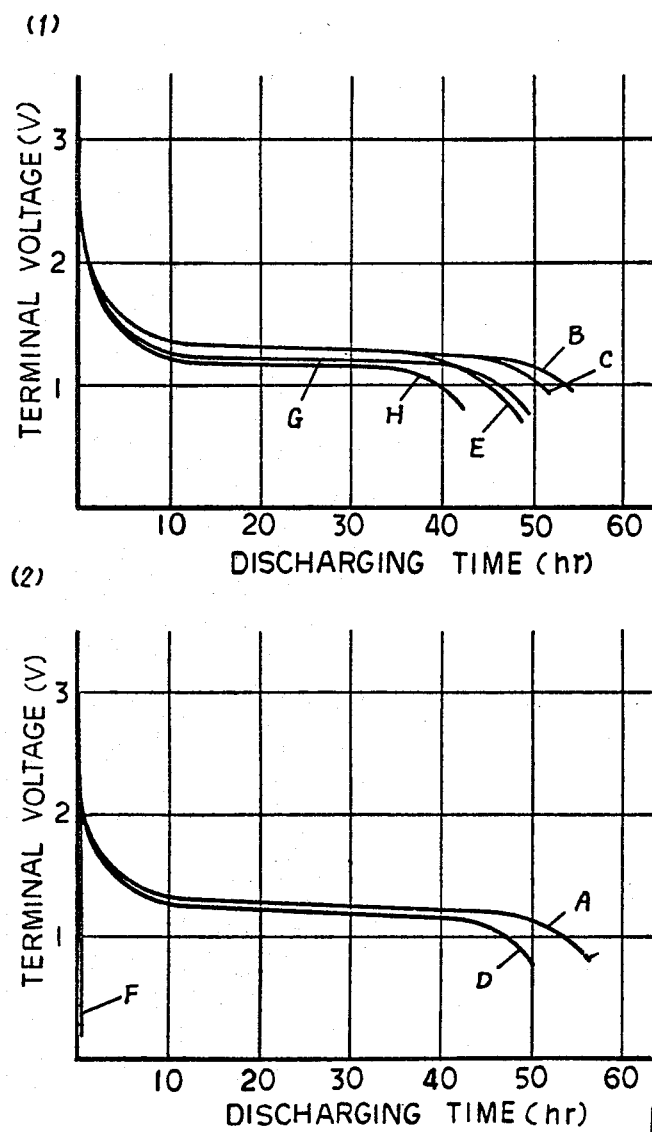
FIG. 1 depicts a graph comparing the discharge characteristics of various CuO/Li batteries under 200 Ω load.

In the following, this invention is described in detail in connection with some embodiments thereof:

DESCRIPTION OF THE PREFERRED EMBODIMENTS

To copper carbonate ($CuCO_3$), lithium oxide ($Li_2O$) or sodium oxide ($Na_2O$) is added in such a proportion that the ratio of the number of alkali metal atoms to the number of copper atoms is 2.0:98.0; the mixture is, then, well mixed in a mortar. This mixed powder is transferred to a quartz boat, which is, then, held in an electric furnace set at 100° C. for 3 hours, and the boat with its content is heated in an atmosphere of air. Thereafter, for the one with $Li_2O$ added, the temperature of the furnace is further raised to 400° C., and at 400° C., it is heated for 30 hours, while the one with $Na_2O$ added is heated at 900° C. for 30 hours; and then, the power supply to the furnace is interrupted to let the powder gradually cool down.

The CuO obtained in this way is ground in the mortar to such a degree that the powder is passable through a 200 mesh sieve. The result of the X-ray diffraction of CuO obtained showed the peak attributable to CuO only. With regard to the amount of the Li atoms in CuO, the result of chemical analysis indicated that the ratio of Li atoms to Cu atoms had fallen down to 1.5:98.5. This is thought to have resulted from partial sublimation of $Li_2O$ during the heating, the residue forming the solid solution with CuO. In the case of $Na_2O$, the ratio of Na atoms to Cu atoms was found to be 1.8:98.2.

Furthermore, in another example, lithium oxide was added to copper carbonate in such composition that the ratio of the number of lithium atoms to that of copper atoms is above 5:95, then the mixture was heated to produce the solid solution. But the result of X-ray diffraction of thus obtained solid solution showed the peaks attributed to not only CuO but $Li_2O$. From this fact, it was seemed that a part of $Li_2O$ remained as a residue without reacting with CuO. Therefore, it is believed, in case that the ratio of the number of lithium atoms to that of the copper atoms in the mixture is below 5:95, only the solid solution consisting of CuO and $Li_2O$ may be obtained, while in case the ratio is above 5:95, the solid solution thereof and $Li_2O$ which does not react with CuO may be obtained.

(2) The Manufacturing Method of the Cathode from CuO 1.5 g of the CuO powder ground to be passable through the 200 mesh sieve is press-formed at 1 ton/cm$^2$ into sheets 20×20 mm in size sandwiching between them a nickel screen being the electric collector. Then, this plate is heated for 3 hours in an electric furnace at 400° C. In this way, the CuO powder is slightly sintered, to form a hard electrode. This electrode has a size of 19.5×19.5 and a thickness of 1.1 mm, and since the theoretical coulombic capacity for this plate is 1.0 Ah, the theoretical capacity per 1 cm$^3$ is 2.4 Ah. The lattice constant of solid solution of CuO and alkali metal oxide is unaltered, if the ratio of the number of alkaline metal atoms to that of Cu atoms runs below 5:95 and therefore the coulombic capacity, determined from the lattice constant of CuO, is 4.26 Ah/cm$^3$. The smaller volumetric capacity of the cathode than crystalographically determined seems to be due to the existence of the pore between particles, for the plate is formed by stamping the CuO powder.

According to another conventional manufacturing method of a cathode, 1 g of the mixed powder prepared by adding 7 parts (weight ratio) of acetylene black as the conductive material and 10 parts of copolymer of tetrafluoroethylen and hexafluoropropylene to 100 parts of the CuO powder obtained by thermal decomposition of copper carbonate is press-formed at 1 ton/cm$^2$ into a size of 20×20 mm sandwiching between the powder a nickel net being the electric collector. The electrode plate formed in this way has a thickness of 1.2 mm, and a theoretical electric capacity of 0.57 Ah, and a volumetric capacity of the electrode of 1.2 Ah/cm$^3$ are obtained.

(3) The Manufacturing Method of the Battery

By cutting off the active material of the end part of the cathode, part of the nickel net being used as the collector is exposed. A nickel ribbon as the lead wire is spot-welded onto a part of this nickel net. About this cathode, a non-woven cloth of polypropylene as a separator is wound. On the other hand, as the anode, lithium metal is used. A lithium plate of 1 mm thickness is cut to a size of 2×2 cm. On this plate, a nickel wire as the lead wire is mounted and further, on top of this, a nickel net as the electric collector is placed. Thereafter, both the nickel net and the nickel wire are press-bonded onto the lithium plate. Between 2 sheets of the lithium plates, the aforementioned cathode electrode wound with the separator is inserted; the three parties are put together in a close fit, and are bound by winding a nickel wire around the outer circumference.

A group of such electrodes obtained in this way are put in the cell of the battery, are, then, impregnated with an electrolyte having 1 mol/l of LiBF$_4$ dissolved in γ-butyrolactone under a reduced pressure, and thereafter, the opening of the cell of the battery is hermetically sealed.

(4) Comparison of the Discharge Characteristics of Batteries

As the cathode material, the solid solution of Li$_2$O and CuO (ratio of the number of atoms, Li/Cu=1.5/95.3) the solid solution (ratio of the number of atoms, Na/Cu=1.8/98.2) or CuO obtained through thermal decomposition of copper carbonate CuCO$_3$ by heating it at a temperature of 400° C. for 30 hours is used. Such an active material singly or its mixture with acetylene black as the conductive material and copolymer of tetrafluoroethylene and hexafluoropopylene as the binder is press-formed together with the electric collector to form various test cathodes, with which Li/CuO batteries like those above described are set up. Comparisons in the discharge characteristics of those batteries with various cathode were made as in the table. The discharge capacities are determined to a cut-off voltage of 1 V.

Table I

| Type of CoO | Composition of the positive electrode (weight ratio) | Battery | Theoretical electric capacity per unit volume of cathode (Ah/cm$^3$) | Theoretical electric capacity of cathode (Ah) | 200 Discharge Volumetric capacity of the output of the positive electrode (Ah/cm$^3$) | Utilization rate (90) | 2K Discharge Volumetric capacity of the output of the positive electrode (Ah/cm$^3$) | Utilization rate (90) |
|---|---|---|---|---|---|---|---|---|
| CuO having Li$_2$O as a solid solution | CuO only | A | 2.4 | 1.0 | 0.76 | 32 | 2.09 | 87 |
| | 100 CuO, 7 conductor, 70 binder | B | 1.2 | 0.57 | 0.72 | 60 | 1.10 | 92 |
| | 100 CuO, 3 conductor, 5 binder | C | 1.6 | 0.62 | 0.83 | 52 | 1.44 | 90 |
| CuO having Na$_2$O as a solid solution | CuO only | D | 2.4 | 1.0 | 0.70 | 29 | 1.97 | 82 |
| | 100 CuO, 7 conductor, 10 binder | E | 1.2 | 0.57 | 0.62 | 52 | 1.06 | 88 |
| CuO having no metal oxides as solid solutions | CuO only | F | 2.4 | 1.0 | 0 | 0 | 0 | 0 |
| | 100 CuO, 7 conductor, 10 binder | G | 1.2 | 0.57 | 0.60 | 50 | 1.04 | 87 |
| | 100 CuO, 3 conductor, 5 binder | H | 1.6 | 0.62 | 0.59 | 37 | 1.25 | 78 |

FIG. 1 shows discharge curves for these batteries under 200Ω load at 20° C. It indicates that batteries employing, as a cathodic active material, the solid solutions of alkali metal oxide and CuO as a mother substance give high discharge voltages and high utilization of cathodic active materials.

Figure 2:
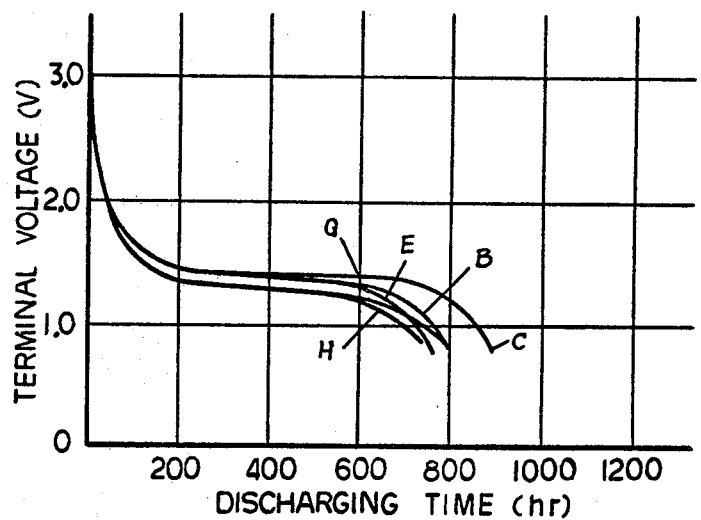
FIG. 2 gives a graph comparing the discharge characteristics under 2 KΩ load.
Figure 2:
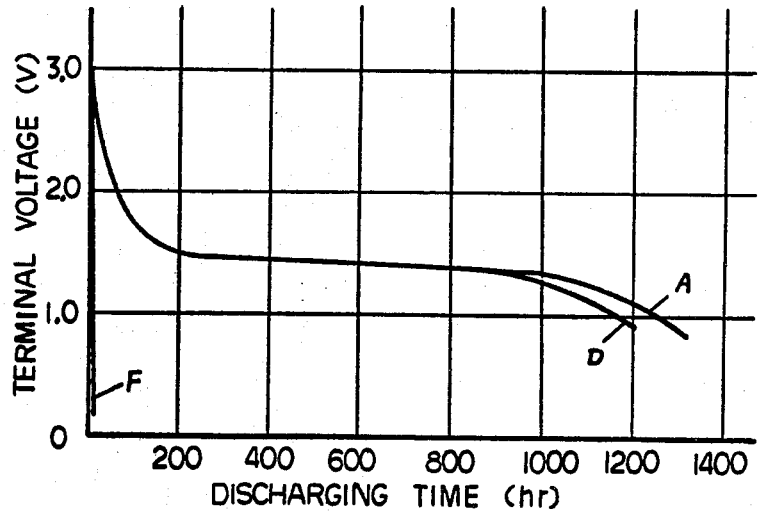

FIG. 2 shows discharge curves for these batteries under 2KΩ load at 20° C. In the case of such a low rate discharge, even if the cathode is composed merely of the CuO having alkali metal oxides as solid solutions, the utilization ratio of CuO and the discharge voltage are high, and volumetric coulombic capacity is remarkably large.

In the case of high rate discharge, if the cathode is composed merely of the CuO having alkali metal oxides as solid solutions without the addition of the acetylene black as the conductor, the utilization ratio of discharge decreases, as compared with the low rate discharge. This is believed to be attributable to the wetness of the cathode. It seems reasonable that because of the ability of the acetylene black used as the conductor to absorb liquid, the electrolyte is well supplied to CuO in the cathode even during the time of discharge; but when CuO is used alone, the supply of the electrolyte into the cathode is insufficient. However, in the case of low rate discharge, even if the cathode is composed of CuO only, electrolyte suppliment into the cathode is satisfactory.

As described in the foregoing, the high discharge voltage obtained by employing, as a cathodic active material, the solid solution of alkali metal oxides and CuO as a mother substance seems to have resulted from a notable increase in the electrical conductivity of CuO. According to the embodiments, the specific conductivity of the CuO having $Li_2O$ as a solid solution (ratio of the number of atoms, Li/Cu=1.5/98.5) was about 1 $\mho$/cm, and that of the CuO having $Na_2O$ as a solid solution (ratio of number of atoms, Na/Cu=1.8/98.2) about $1.2 \times 10^{-1}$ $\mho$/cm. In this connection, the specific conductivity of the CuO having both $Na_2O$ and $Li_2O$ as solid solution (ratio of the number of atoms, Na/Li/Cu=1.5/1.5/97) was about 1 $\mho$/cm. Comparison of these values with the specific conductivity of the CuO having no alkali metal oxides as solid solutions, which is about $3 \times 10^{-3}$ $\mho$/cm, indicates that the conductivity is increased by about $10^4$-$10^5$ times.

Figure 3:
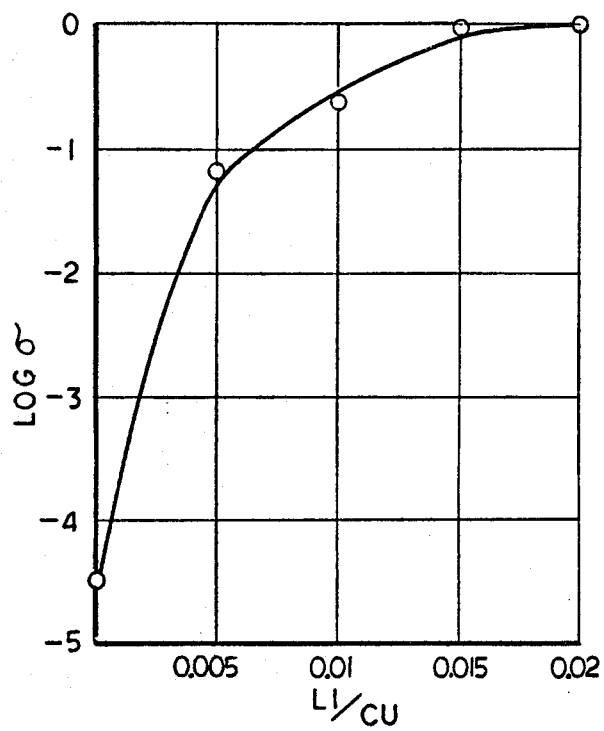
FIG. 3 presents a graph showing the relationship between the Li/Cu ratio and the electric conducitivity of the CuO having $Li_2O$ as a solid solution.

FIG. 3 depicts the relationship between the ratio of the number of atoms Li/Cu and the electrical conductivity in the CuO having $Li_2O$ as a solid solution, for the temperature of 20° C. This graph clearly indicates that the electrical conductivity of CuO is notably improved by the existence of the Li atoms in CuO. Especially, where ratio of number of Li atom to that of Cu atom is above 0.5:99.5, the conductivity of solid solution of CuO is considerably improved. The CuO having no alkali metal oxides as solid solutions has a low electric conductivity, and accordingly, a large Ohmic loss and low discharge voltage.

As described in the foregoing, the present invention makes it possible to elevate the energy density of the organic electrolyte batteries in which copper oxide is used as their cathodic active material.

What we claim is:

1. In an organic electrolyte battery containing an anode having, as an active material, a light metal, an organic electrolyte comprising an inorganic salt dissolved in an organic solvent, and a cathode, the improvement wherein said cathode comprises as an active material a solid solution of cupric oxide as a mother substance and at least one alkali metal oxide, wherein the ratio of the number of alkali metal atoms to that of copper atoms in the solid solution is from 0.5:99.5 to 5:95.

2. An organic electrolyte battery according to claim 1, wherein the alkali metal oxide is lithium oxide.

3. An organic electrolyte battery according to claim 1, wherein the alkali metal oxide is sodium oxide.

4. An organic electrolyte battery according to claim 1, wherein the light metal is selected from the group consisting of lithium, aluminum and magnesium.

5. An organic electrolyte battery according to claim 1, wherein the organic electrolyte is composed of γ-butyrolactone having dissolved therein 1 mol/l of $LiBF_4$.

6. An organic electrolyte battery according to claim 5, wherein a nickel screen is disposed within the cathode.

7. An organic electrolyte battery according to claim 1, wherein the cathode comprises a powdered mixture of the cupric oxide, and an oxide of alkali metal as a solid solution, an electrically conducting agent and a binder.

8. An organic electrolyte battery according to claim 7, wherein the electrically conducting agent is acetylene black.

9. An organic electrolyte battery according to claim 7, wherein the binder is a copolymer of tetrafluoroethylene and hexafluoropropylene.

10. An organic electrolyte battery according to claim 9, wherein a nickel screen is disposed within the cathode.

11. An organic electrolyte battery according to claim 1, wherein the cathode is composed of a sintered body of the cupric oxide, including an oxide of an alkali metal as a solid solution.

* * * * *